United States Patent
Dong et al.

(10) Patent No.: US 12,423,952 B1
(45) Date of Patent: Sep. 23, 2025

(54) METHOD FOR CLASSIFYING GEOLOGICAL SECTION, STORAGE MEDIUM AND DEVICE

(71) Applicant: China University of Geosciences, Hubei (CN)

(72) Inventors: Shan Dong, Hubei (CN); Jingrui Jiang, Hubei (CN); Jiacheng Hou, Hubei (CN); Xi Hu, Hubei (CN); Lianke Li, Hubei (CN)

(73) Assignee: China University of Geosciences, Wuhan (CN)

( * ) Notice: Subject to any disclaimer, the term of this patent is extended or adjusted under 35 U.S.C. 154(b) by 0 days.

(21) Appl. No.: 19/224,711

(22) Filed: May 30, 2025

(51) Int. Cl.
*G06V 10/764* (2022.01)
*G06V 10/72* (2022.01)
*G06V 10/77* (2022.01)
*G06V 20/13* (2022.01)

(52) U.S. Cl.
CPC ............ *G06V 10/765* (2022.01); *G06V 10/72* (2022.01); *G06V 10/7715* (2022.01); *G06V 20/13* (2022.01)

(58) Field of Classification Search
None
See application file for complete search history.

(56) References Cited

U.S. PATENT DOCUMENTS

| | | | |
|---|---|---|---|
| 9,121,808 B2 * | 9/2015 | Leyte Guerrero | G01N 23/04 |
| 11,313,994 B2 * | 4/2022 | Salman | G01V 1/50 |
| 2009/0103677 A1 * | 4/2009 | Wood | G01N 23/046 |
| | | | 378/53 |
| 2011/0004447 A1 * | 1/2011 | Hurley | G06T 17/00 |
| | | | 702/179 |

(Continued)

FOREIGN PATENT DOCUMENTS

| CN | 105651966 A | | 6/2016 | |
|---|---|---|---|---|
| CN | 118965189 A | * | 11/2024 | G01V 20/00 |

(Continued)

OTHER PUBLICATIONS

Google Patent Translation of CN118965189A, Available online at https://patents.google.com/patent/CN118965189A/en?oq= 118965189+, Originally published Nov. 15, 2024, Date accessed Jul. 12, 2025 (Year: 2024).*

*Primary Examiner* — Tahmina N Ansari

(57) ABSTRACT

The disclosure relates to the technical field of geological exploration, and disclosed in the disclosure are a method for classifying a geological section, a storage medium and a device. The method includes: acquiring on-site exploration data and remote sensing data of a geological section, and a category label of the geological section, preprocessing the data, and extracting features; constructing new features on the basis of extracted features, and forming a feature set; selecting and normalizing features in the feature set, and dividing same into a training set and a validation set; and constructing a geological section classification model, and inputting data to be tested into the model after validating to obtain geological section classification results. According to the method of the disclosure, knowledge related to geology is fully utilized to enhance feature expression ability, improve generalization ability and interpretability of the model, and capture complex nonlinear relationships.

12 Claims, 1 Drawing Sheet

(56) References Cited

U.S. PATENT DOCUMENTS

| | | | |
|---|---|---|---|
| 2012/0197526 A1* | 8/2012 | Leyte Guerrero | G01N 23/04 |
| | | | 250/311 |
| 2014/0067351 A1* | 3/2014 | Gray | G01V 20/00 |
| | | | 703/6 |
| 2017/0286574 A1* | 10/2017 | Chappell | G06F 30/20 |
| 2019/0025461 A1* | 1/2019 | Wiener | E21B 47/14 |
| 2024/0426803 A1* | 12/2024 | Rogers | G01N 33/24 |
| 2025/0129701 A1* | 4/2025 | Eyvazzadeh | E21B 49/00 |
| 2025/0179904 A1* | 6/2025 | Cancio Rocha Da Silva Junior | E21B 45/00 |

FOREIGN PATENT DOCUMENTS

| | | | | |
|---|---|---|---|---|
| WO | 2014020778 A1 | 2/2014 | | |
| WO | WO-2024252180 A1 * | 12/2024 | | G06T 7/174 |
| WO | WO-2025122683 A1 * | 6/2025 | | |

\* cited by examiner

METHOD FOR CLASSIFYING GEOLOGICAL SECTION, STORAGE MEDIUM AND DEVICE

CROSS-REFERENCE TO RELATED APPLICATION

This application claims priority of Chinese Patent Application No. 202411433131.9, filed on Oct. 5, 2024, the entire contents of which are incorporated herein by reference.

TECHNICAL FIELD

The disclosure relates to the technical field of geological exploration, and in particular to a method for classifying a geological section, a storage medium and a device.

BACKGROUND

Geological section classification, which is a related task in the fields of geology and engineering, can assist geologists in comprehending the internal structure of the earth and the distribution of rock strata, thereby discovering the evolutionary history of the earth. Additionally, the geological section classification can provide an important reference for mineral exploration. By analyzing geologic features of a geological section, the distribution pattern of mineral resources can be determined. The geological sampling and analysis mostly involve that samples after being collected are subjected to physical and chemical analyses in a laboratory to determine the properties and types of rocks. On the basis of spectral analysis, different rocks and minerals are classified and identified by using their spectral features.

In the prior art, machine learning and artificial intelligence models are also successively applied in geological section identification and classification. The models are used to receive the geological features of the geological section for identification. However, there are complex nonlinear relationships in the geological features of the geological section, which are not considered by the models in the prior art when they are put into use, nor the knowledge of geology is fully utilized. Relying on raw data and basic features only, the models lack the support from professional knowledge, and struggle to fully utilize the knowledge of geology, resulting in the failure of the models to accurately identify complex geological phenomena, which leads to a reduction in the accuracy of classification.

SUMMARY

An objective of the disclosure lies in that: to solve the problem that the existing methods for classifying a geological section fail to fully leverage the knowledge of geology, resulting in low accuracy of classification, a method for classifying a geological section is provided, which includes the following steps:

S1, acquiring on-site exploration data and remote sensing data of a geological section, and a category label of the geological section, preprocessing the on-site exploration data and the remote sensing data, and extracting features on the basis of preprocessed data;

S2, constructing new features on the basis of extracted features, and combining the extracted features and the new features to form a feature set;

S3, selecting and normalizing features in the feature set, and dividing same into a training set and a validation set; and S4, constructing a geological section classification model, using a light gradient boosting machine (LightGBM) as a model benchmark architecture, training the model using the training set and the category label of the geological section, validating the model after training using the validation set, and inputting data to be tested into the model after validating to obtain geological section classification results.

Further, the preprocessing the on-site exploration data and the remote sensing data is specifically:
converting the on-site exploration data and the remote sensing data to a unified coordinate system, and performing a temporal alignment on dynamically changing data to obtain data consistent in position and time.

Further, the extracted features include: a density, a porosity, a mineral content, a particle size distribution, a color index and a saturation.

Further, constructing new features on the basis of extracted features is represented as:

$$C = a \times \log(\rho \times \phi) + b \times \sqrt{M \times D} + c \times \frac{CI}{S+1} + a \times \sin(D \times \phi) + b \times \exp\left(\frac{\rho}{S+1}\right)$$

where C represents rock content, a, b and c represent weight coefficients, $\rho$ represents the density, $\phi$ represents the porosity, M represents the mineral content, D represents the particle size distribution, CI represents the color index of rocks, and S represents the saturation.

Further, a variance selection method is used to select the features in the feature set, a variance of each feature is calculated, a threshold value is set, and features with variances greater than the threshold value are selected.

Further, initial parameters of the geological section classification model include: a learning rate, the number of trees, a maximum depth, the minimum number of samples for split, the minimum number of samples for leaf, a subsample ratio and a feature selection ratio.

The disclosure further provides a computer-readable storage medium. The computer-readable storage medium has a computer program stored thereon. The above-mentioned method for classifying a geological section is implemented when the computer program is executed by a processor.

The disclosure further provides an electronic device, including a processor and a memory, and the processor is connected to the memory. The memory is configured to store a computer program, the computer program includes a computer-readable instruction, and the processor is configured to invoke the computer-readable instruction to implement the above-mentioned method for classifying a geological section.

The beneficial effects brought by the technical solutions provided in the disclosure are as follows.

In the disclosure, geological section features are utilized to construct the new features, and they are jointly utilized for geological section classification. The geological section classification model, which uses LightGBM as the benchmark architecture, is constructed, and the geological section features and the new features serve as inputs of the model. According to the method of the disclosure, additional input features are constructed on the basis of the geological section features. The model can fully utilize the knowledge related to geology, to enhance the feature expression ability, improve the generalization ability and interpretability of the model, and capture complex nonlinear relationships.

DETAILED DESCRIPTION

For clearer objectives, technical solutions and advantages of the disclosure, the implementations of the disclosure are further described with reference to the accompanying drawings.

Figure 1:
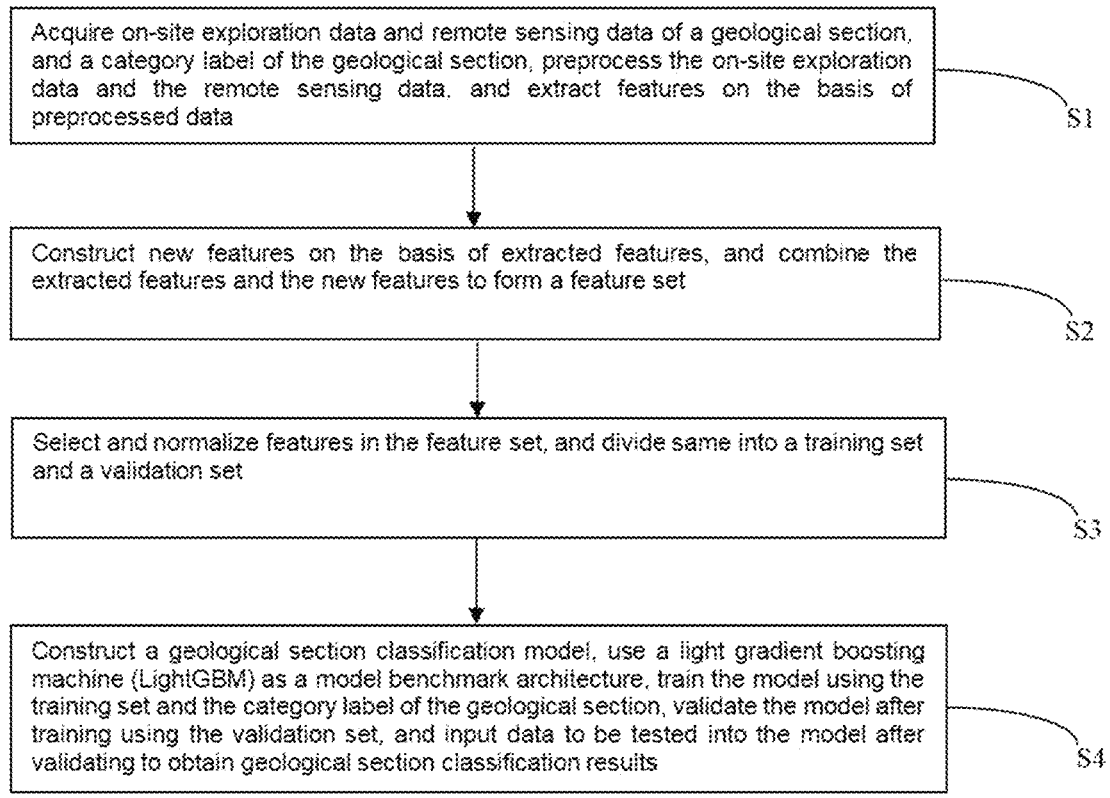
FIG. 1 is a flow chart of a method for classifying a geological section according to an embodiment of the disclosure.

A flow chart of a method for classifying a geological section according to an embodiment of the disclosure is as shown in FIG. 1, and specifically includes the following steps.

S1, on-site exploration data and remote sensing data of a geological section, and a category label of the geological section are acquired, the on-site exploration data and the remote sensing data are preprocessed, and features are extracted on the basis of preprocessed data.

The remote sensing data are acquired on the basis of high-resolution satellite images and aerial images.

The data preprocessing includes: cleaning data to remove outliers and noise; filling missing values by means of a mean value; and converting the on-site exploration data and the remote sensing data to a unified coordinate system, and performing a temporal alignment on dynamically changing data to obtain data consistent in position and time.

Features of on-site measured data and features of the remote sensing data are fused to form an integrated feature vector. The fusion includes original level fusion, feature level fusion and decision level fusion. The original level fusion involves preliminary fusion of data at the data acquisition phase. The feature level fusion involves fusion and integration of features at the feature extraction phase. The decision level fusion is a high-level fusion, and since data are condensed, comparatively, this method generates least accurate results, but it involves minimum computation and minimum demands on communication bandwidth.

After the above preprocessing, the preprocessed data are obtained, features of which are extracted. The extracted features include: a density, a porosity, a mineral content, a particle size distribution, a color index and a saturation.

The density, which is one of the main features that characterize the physical properties of rocks, is closely linked to rock porosity, mineral content, water content, etc. Regional rock stratum has a certain variation rule in density feature due to the differences of factors such as formation age, environment and material composition.

The porosity plays an obviously important role in geology, controlling the storage of fluids in water-bearing stratum, oil and gas fields, and geothermal systems. The range and communication of pore structures control the flow and transportation of fluids across the geological structures, as well as the relationship between the property of individual mineral and the overall property of the stratum.

The mineral content is very essential for lithology division, sedimentary environment determination, provenance direction analysis, etc. In a method of area analysis, the ratio of the number of pixels occupied by minerals to the total number of pixels represents the mineral content.

The particle size distribution: the percentage of particles in a series of different particle size intervals to the total amount of the sample reflected by a certain method is called particle size distribution.

The color index is a quantitative evaluation on color of minerals using colorimetry principles applied in modern times. The color index includes parameters such as visual reflectance, chromaticity coordinate values x, y and z, and dominant wavelength of colors.

The saturation determines color components in a color space. The higher the saturation, the darker the color; and the lower the saturation, the lighter the color.

S2, new features are constructed on the basis of extracted features, and the extracted features are combined with the new features to form a feature set.

The construction of the new features is represented as:

$$C = a \times \log(\rho \times \phi) + b \times \sqrt{M \times D} + c \times \frac{CI}{S+1} + a \times \sin(D \times \phi) + b \times \exp\left(\frac{\rho}{S+1}\right)$$

where C represents rock content, a, b and c represent weight coefficients, $\rho$ represents the density, $\phi$ represents the porosity, M represents the mineral content, D represents the particle size distribution, CI represents the color index of rock, and S represents the saturation.

a×log($\rho$×$\phi$) represents the effect of the logarithm of the product between density $\rho$ and porosity $\phi$ on the rock content. The logarithmic function serves for processing data of different orders of magnitude, making the data smoother in calculation. The meaning it represents is that the combination of density and porosity may affect the physical properties of rocks, specifically hardness and reservoir capacity.

b×$\sqrt{M \times D}$ represents the effect of the square root of the product between mineral content M and particle size distribution D on the rock content. The square root serves for smoothing data, and it means that the combination of the mineral content and particle size reflects structural features of rocks. The structural features include particle size and mineral distribution.

$$C \times \frac{CI}{S+1}$$

represents the effect of the ratio of color index CI to saturation S on the rock content. +1 in the formula is to avoid the situation where the denominator is zero. The relationship between the color index and the saturation may affect the optical properties and reservoir performance of rocks.

a×sin (D×$\phi$) represents the effect of the sinusoidal value of the product between particle size distribution D and porosity $\phi$ on the rock content. The sinusoidal function serves for introducing periodic variations, specifically reflecting the variations of the rock properties in different sedimentary environments caused by the periodic variations of the particle size and porosity.

$$b \times \exp\left(\frac{\rho}{S+1}\right)$$

represents the effect of the exponential value of the ratio between density ρ and saturation S on the rock content. The exponential function serves for processing rapidly changing data, representing that the ratio of density to saturation may affect the mechanical properties and reservoir capacity of rocks.

The value of C is calculated through the above improved formula. For the level of geological section identification, by integrating a plurality of geological features, the content of a certain type of rocks is estimated, which favors for identifying different rock strata in the geological section. For the level of lithologic classification, on the basis of rock content C obtained from calculation, the rock types in the geological section are classified, effectively helping geologists and engineers to rapidly understand the geological structure. For the level of resource exploration, identifying and classifying rock types in geological sections is of great significance for the exploration of mineral resources and groundwater resources. For the level of disaster prediction, understanding the rock types in geological section contributes to predicting and preventing geological disaster. The geological disaster specifically refers to landslide and debris flow.

Numerical values of various features of sample No. 1 collected in an embodiment of the disclosure are as shown in Table 1.

TABLE 1

| Sample | Density (ρ) | Porosity (φ) | Mineral content (M) | Particle size distribution (D) | Color index (CI) | Saturation (S) |
|---|---|---|---|---|---|---|
| No. 1 | 2.7 | 15 | 20 | 1.5 | 0.8 | 30 |

In a specific embodiment of the disclosure, the value of a is 0.5, the value of b is 0.8 and the value of c is 0.3. The value of C is calculated on the basis of the numerical values in the above table.

$$C = 0.5 \times \log(2.7 \times 15) + 0.8 \times \sqrt{20 \times 1.5} -$$
$$0.3 \times \frac{0.8}{30+1} + 0.5 \times \sin(1.5 \times 15) + 0.8 \times \exp\left(\frac{2.7}{30+1}\right) =$$
$$0.5 \times 3.70 + 0.8 \times 5.48 + 0.3 \times 0.03 + 0.5 \times 0.38 + 0.8 \times 1.09 = 7.305$$

Feature vector (ρ, φ, M, D, CI, S, C)=(2.7,15,20,1.5,0.8, 30,7.305) is constructed for sample No. 1, and the value of C is calculated for each sample, and the value of C is added to the feature vector of each sample. All the feature vectors form the feature set.

S3, features in the feature set are selected and normalized, and are divided into a training set and a validation set.

A variance selection method is used to select the features in the feature set, a variance of each feature is calculated, a threshold value is set, and features with variances greater than the threshold value are selected. If the threshold value is set as 0.1, features with variances greater than the threshold value are selected, and features that significantly contribute to the model are retained. On the basis of the set threshold value, features with variances greater than the threshold value are selected to form a new feature set.

Feature standardization: normalization of all the features is performed, making the features have the same dimension and scope. Min-Max is employed to perform normalization, for example, the density is subjected to Min-Max for normalization:

$$\bar{\rho} = \frac{\rho - \rho_{min}}{\rho_{max} - \rho_{min}},$$

where $\bar{\rho}$ represents the density after normalization, $\rho_{min}$ represents a minimum density, and $\rho_{max}$ represents a maximum density.

S4, a geological section classification model is constructed, LightGBM is used as a model benchmark architecture, the model is trained using the training set and the category label of the geological section, the model after training is validated using the validation set, and data to be tested are inputted into the model after validating to obtain geological section classification results. The data to be tested are feature data (density, porosity, mineral content, particle size distribution, color index and saturation) obtained from a geological section to be tested and data (rock content) of the constructed new features.

LightGBM is a distributed gradient boosting framework based on a decision tree algorithm. It uses decision tree algorithm based on histogram, supports for efficient parallel training, and features lower memory usage and higher accuracy. Main characteristics of LightGBM include histogram differential acceleration, leaf-wise growth strategy, category feature support and parallel learning. By adjusting parameters such as num_leaves (the number of leaf nodes) and min_data_in_leaf (the minimum number of samples for each leaf node), overfitting can be effectively prevented and the model performance can be improved.

Initial parameters of the geological section classification model include: a learning rate, the number of trees, a maximum depth, the minimum number of samples for split, the minimum number of samples for leaf, a subsample ratio and a feature selection ratio. 5-fold cross-validation is employed, and grid search will traverse all possible hyper-parameter combinations. During the grid search, the performance of each hyper-parameter combination is assessed using cross-validation, and a combination with the optimal performance is selected. On the basis of the cross-validation, the performance of the model is ensured to be stable in different datasets. The model is retrained using the optimal hyper-parameters, and the performance of the final model is evaluated using a test dataset. The accuracy rate, precision rate, recall rate, and F1-score of the final model are recorded, to ensure the optimal performance of the model in geological section identification.

In an embodiment of the disclosure, the learning rate is set as 0.1. The smaller the learning rate, the slower the model learns, but the performance is more accurate. The number of trees is set as 100. The more trees there are, the more complex the model is. The maximum depth is set as 7. The greater the maximum depth is, the more complex the model is, and the more feature details can be captured. The minimum number of samples for split is set as 2, and this parameter can prevent overfitting when the number of samples is small. The minimum number of samples for leaf is set as 1, and if the value of the minimum number of samples for leaf is too large, it is prone to the problem of model learning noise. The subsample ratio and the feature selection ratio are both set as 0.8.

The error between the predicted results of the model and the actual label is calculated, the source of the error and the performance of the model at different data categories are analyzed, to generate an error distribution plot and a residual plot, showing the error distribution, and identifying samples and categories with larger errors. Samples with larger errors are analyzed in depth, to find the cause of the error. The cause may be data noise, underfitting or overfitting of the model.

The LightGBM model after training is exported and saved to a file format, ensuring that the model can be loaded in a production environment. The model is deployed in the production environment, and an application programming interface (API) or a batch script is set, achieving automated prediction and identification of geological section data. The operation of the model in the production environment is monitored, and the performance and predicted results of the model are regularly checked. The regular intervals are specifically defined as a large period every 7-15 days, and a small period every 2-3 days.

The actual geological section data are imported into the model, and the format of the data is consistent with that of data used during training of the model. On the basis of the validated model, the actual geological section data are predicted, to acquire the predicted results of the model, and a visual chart is generated, and the predicted results are combined with the actual geological section data. The visual chart specifically is a cross-sectional map and a thermodynamic chart.

Continuous feedback and optimization are performed, and the feedback is collected from the deployment end. The problems encountered in practical applications and suggestions for improvement are recorded. The collected feedback is analyzed to identify the improvement points and optimization direction for the model. On the basis of the feedback and analysis results, the structure and parameters of the model are optimized. Incremental training and updating are performed to improve the performance of the model.

By the above-described steps, actual geological section data can be effectively imported to test the model, to validate the automated identification effect of the model, and ensure optimal performance of the model in practical applications by continuous feedback and optimization.

In one exemplary embodiment, a computer-readable storage medium is included. The computer-readable storage medium has a computer program stored thereon. The above-mentioned method for classifying a geological section is implemented when the computer program is executed by a processor.

Figure 2:
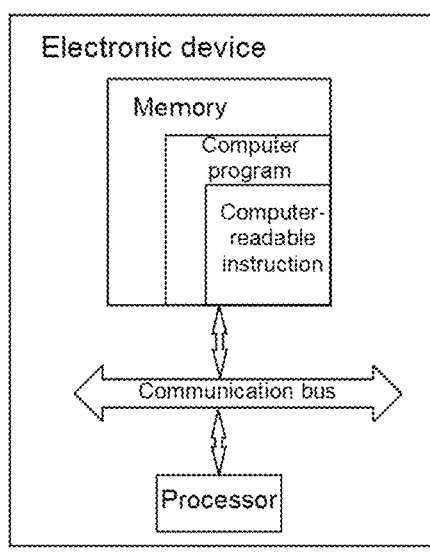
FIG. 2 is a block diagram of an electronic device according to an exemplary embodiment of the disclosure.

Referring to FIG. 2, in one exemplary embodiment, an electronic device is further included, which includes at least one processor, at least one memory, and at least one communication bus.

The memory has a computer program stored thereon. The computer program includes a computer-readable instruction. The processor invokes the computer-readable instruction stored in the memory via the communication bus to implement the above-mentioned method for classifying a geological section.

The foregoing description of the disclosed embodiments enables a person skilled in the art to realize or use the disclosure. Various modifications to these embodiments would have been obvious to those skilled in the art, and the general principles defined herein can be realized in other embodiments without departing from the spirit or scope of the disclosure. Accordingly, the disclosure will not be limited to these examples shown herein, but will be subjected to the broadest scope consistent with the principles and novel features disclosed herein.

The invention claimed is:

1. A method for classifying a geological section, comprising the following steps:
    S1, acquiring on-site exploration data and remote sensing data of a geological section, and a category label of the geological section, preprocessing the on-site exploration data and the remote sensing data, and extracting features on the basis of preprocessed data;
    S2, constructing new features on the basis of extracted features, and combining the extracted features and the new features to form a feature set;
    the extracted features comprising: a density, a porosity, a mineral content, a particle size distribution, a color index and a saturation; and
    construction of the new features being represented as:

$$C = a \times \log(\rho \times \phi) + b \times \sqrt{M \times D} + c \times \frac{CI}{S+1} + a \times \sin(D \times \phi) + b \times \exp\left(\frac{\rho}{S+1}\right)$$

where C represents rock content, a, b and c represent weight coefficients, $\rho$ represents the density, $\phi$ represents the porosity, M represents the mineral content, D represents the particle size distribution, CI represents the color index of rocks, and S represents the saturation;
    S3, selecting and normalizing features in the feature set, and dividing same into a training set and a validation set; and
    S4, constructing a geological section classification model, using a light gradient boosting machine (LightGBM) as a model benchmark architecture, training the model using the training set and the category label of the geological section, validating the model after training using the validation set, and inputting data to be tested into the model after validating to obtain geological section classification results.

2. The method for classifying a geological section according to claim 1, wherein the preprocessing the on-site exploration data and the remote sensing data is specifically:
    converting the on-site exploration data and the remote sensing data to a unified coordinate system, and performing a temporal alignment on dynamically changing data to obtain data consistent in position and time.

3. The method for classifying a geological section according to claim 1, wherein a variance selection method is used to select the features in the feature set, a variance of each variance is calculated, a threshold value is set, and features with variances greater than the threshold value are selected.

4. The method for classifying a geological section according to claim 1, wherein initial parameters of the geological section classification model comprise: a learning rate, the number of trees, a maximum depth, the minimum number of samples for split, the minimum number of samples for leaf, a subsample ratio and a feature selection ratio.

5. A non-transitory computer-readable storage medium, the computer-readable storage medium having a computer program stored thereon, wherein the method according to claim 1 is implemented when the computer program is executed by a processor.

6. A non-transitory computer-readable storage medium, the computer-readable storage medium having a computer program stored thereon, wherein the method according to claim 2 is implemented when the computer program is executed by a processor.

7. A non-transitory computer-readable storage medium, the computer-readable storage medium having a computer program stored thereon, wherein the method according to claim 3 is implemented when the computer program is executed by a processor.

8. A non-transitory computer-readable storage medium, the computer-readable storage medium having a computer program stored thereon, wherein the method according to claim 4 is implemented when the computer program is executed by a processor.

9. An electronic device, comprising a processor and a memory, and the processor being connected to the memory, wherein the memory is configured to store a computer program, the computer program comprises a computer-readable instruction, and the processor is configured to invoke the computer-readable instruction to implement the method according to claim 1.

10. An electronic device, comprising a processor and a memory, and the processor being connected to the memory, wherein the memory is configured to store a computer program, the computer program comprises a computer-readable instruction, and the processor is configured to invoke the computer-readable instruction to implement the method according to claim 2.

11. An electronic device, comprising a processor and a memory, and the processor being connected to the memory, wherein the memory is configured to store a computer program, the computer program comprises a computer-readable instruction, and the processor is configured to invoke the computer-readable instruction to implement the method according to claim 3.

12. An electronic device, comprising a processor and a memory, and the processor being connected to the memory, wherein the memory is configured to store a computer program, the computer program comprises a computer-readable instruction, and the processor is configured to invoke the computer-readable instruction to implement the method according to claim 4.

* * * * *